(12) United States Patent
Hishida et al.

(10) Patent No.: US 11,277,048 B2
(45) Date of Patent: Mar. 15, 2022

(54) INSULATOR, AND STATOR AND MOTOR COMPRISING SAME

(71) Applicant: PANASONIC INTELLECTUAL PROPERTY MANAGEMENT CO., LTD., Osaka (JP)

(72) Inventors: Mitsuoki Hishida, Osaka (JP); Hiroshi Yoneda, Osaka (JP); Hirokatsu Kunitomo, Osaka (JP); Yuichi Yoshikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 194 days.

(21) Appl. No.: 16/628,954

(22) PCT Filed: May 25, 2018

(86) PCT No.: PCT/JP2018/020204
§ 371 (c)(1),
(2) Date: Jan. 6, 2020

(87) PCT Pub. No.: WO2019/058644
PCT Pub. Date: Mar. 28, 2019

(65) Prior Publication Data
US 2020/0220415 A1 Jul. 9, 2020

(30) Foreign Application Priority Data
Sep. 20, 2017 (JP) .............................. JP2017-180488

(51) Int. Cl.
*H02K 21/16* (2006.01)
*H02K 1/27* (2022.01)
(Continued)

(52) U.S. Cl.
CPC ............. *H02K 3/522* (2013.01); *H02K 1/146* (2013.01); *H02K 1/276* (2013.01); *H02K 21/16* (2013.01);
(Continued)

(58) Field of Classification Search
CPC ........ H02K 1/146; H02K 1/276; H02K 21/16; H02K 2203/12; H02K 2213/03;
(Continued)

(56) References Cited

U.S. PATENT DOCUMENTS 6,356,001 B1 3/2002 Nishiyama et al.
2003/0011271 A1* 1/2003 Takano .................. H02K 3/522
310/254.1

(Continued)

FOREIGN PATENT DOCUMENTS

DE     202 04 507 U1    6/2002
JP      H11-122855 A    4/1999

(Continued)

OTHER PUBLICATIONS

International Search Report issued in International Patent Application No. PCT/JP2018/020204, dated Aug. 7, 2018; with English translation.

(Continued)

*Primary Examiner* — Alex W Mok
(74) *Attorney, Agent, or Firm* — McDermott Will and Emery LLP

(57) ABSTRACT

An insulator includes a part to be wound with a coil of a wiring wire with a circular cross section; first and second flanges. The first flange is formed at the side of the part closer to a core segment. The second flange is formed at the side closer to a distal end of a tooth. The part to be wound with the coil has a slope continuous with the first flange and inclined so that a height from an upper surface of the tooth (Continued)

increases from the first flange toward the second flange. Expression $0<(-6.8D+b)\leq\alpha<30$ is satisfied, where b is a constant and $8.3\leq b\leq 11.6$ is satisfied, D (mm) is a diameter of the coil, and $\alpha$ (°) is an angle of the slope inclined from the upper surface of the tooth as a reference surface.

9 Claims, 12 Drawing Sheets

(51) Int. Cl.
 H02K 1/14 (2006.01)
 H02K 3/52 (2006.01)
 H02K 1/276 (2022.01)
(52) U.S. Cl.
 CPC ..... *H02K 2203/12* (2013.01); *H02K 2213/03* (2013.01)
(58) Field of Classification Search
 CPC .......... H02K 3/522; H02K 1/148; H02K 3/34; H02K 3/345
 USPC .................................................... 310/156.56
 See application file for complete search history.

(56) References Cited

U.S. PATENT DOCUMENTS

| | | | |
|---|---|---|---|
| 2012/0286619 A1* | 11/2012 | Tsuiki | H02K 3/522 310/215 |
| 2013/0009512 A1 | 1/2013 | Tashiro et al. | |
| 2014/0203671 A1* | 7/2014 | Ha | H02K 1/04 310/43 |
| 2015/0022048 A1* | 1/2015 | Oka | H02K 3/52 310/208 |

FOREIGN PATENT DOCUMENTS

| | | |
|---|---|---|
| JP | 2006-115565 A | 4/2006 |
| JP | 2007-325331 A | 12/2007 |
| WO | 2011/118357 | 9/2011 |

OTHER PUBLICATIONS

Extended European Search Report issued in European Patent Application No. 18859024.4, dated Oct. 30, 2020.

\* cited by examiner

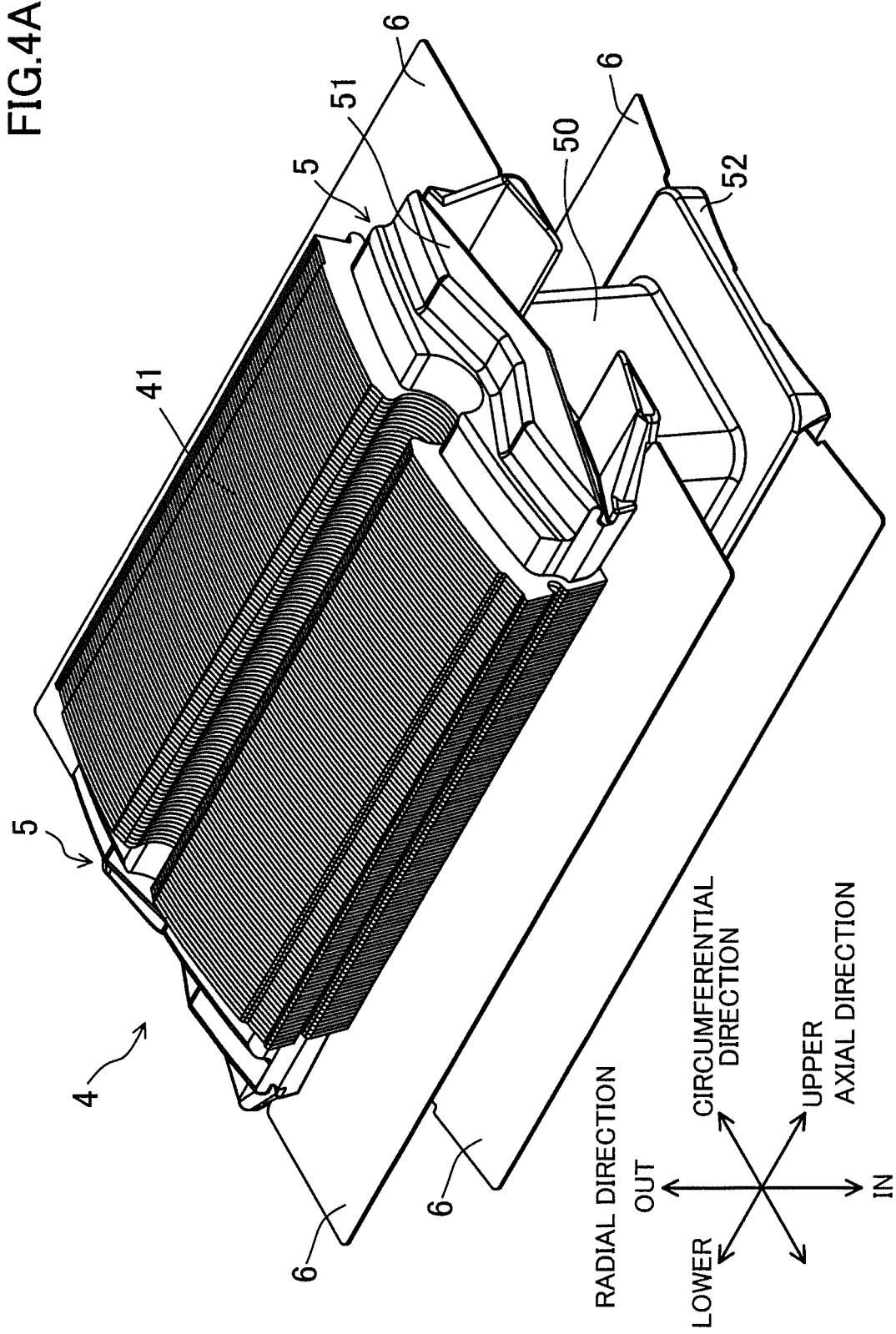

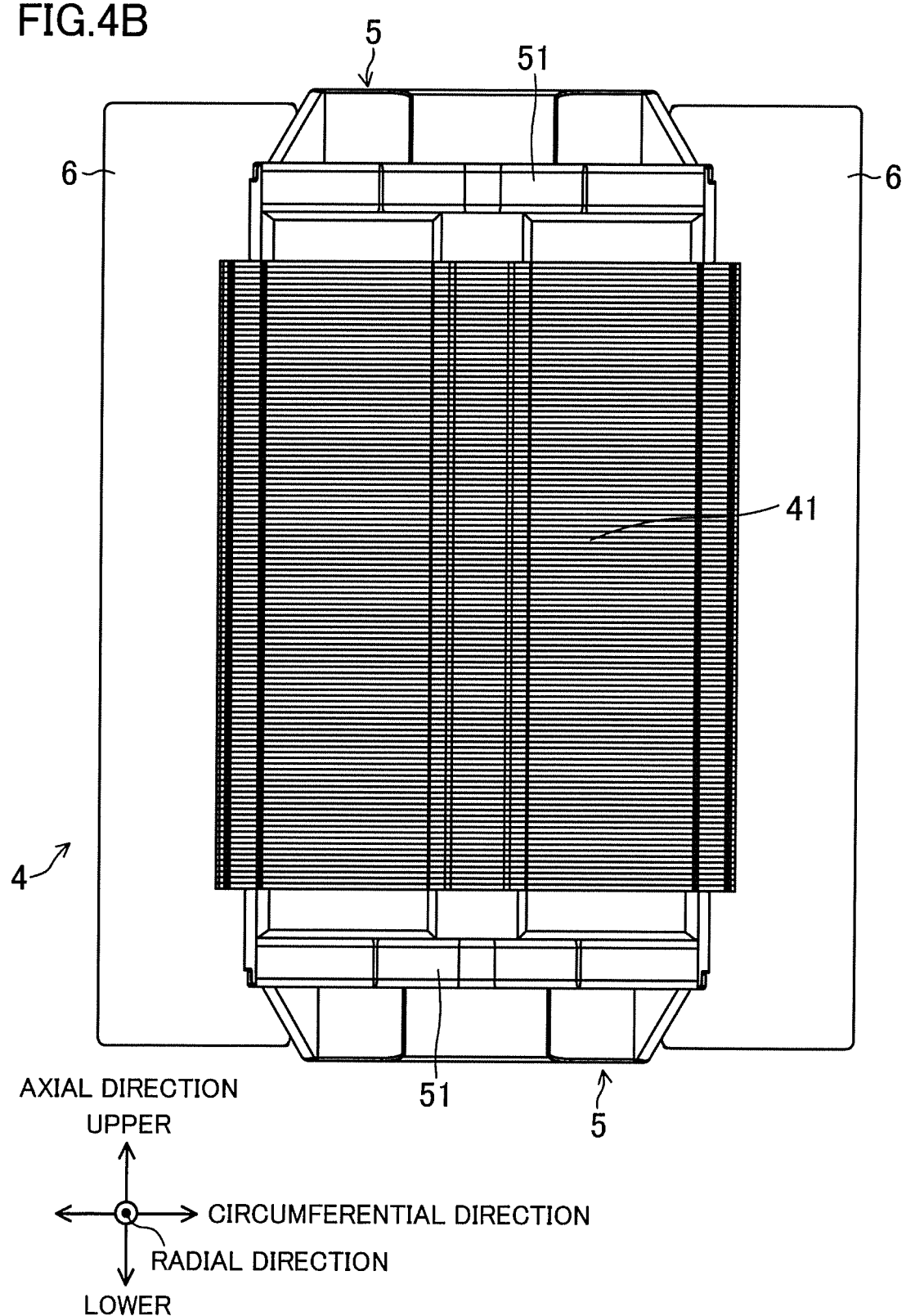

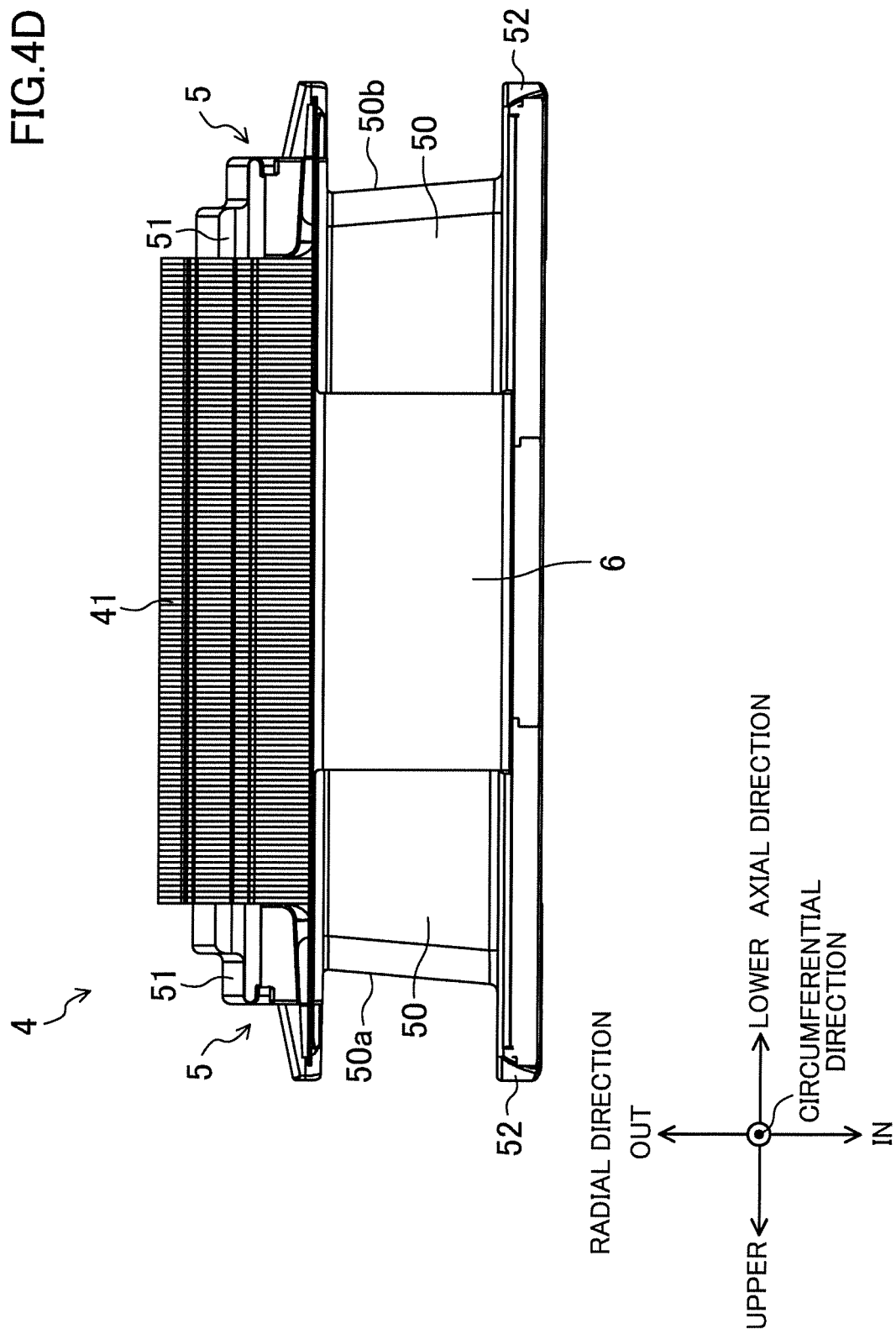

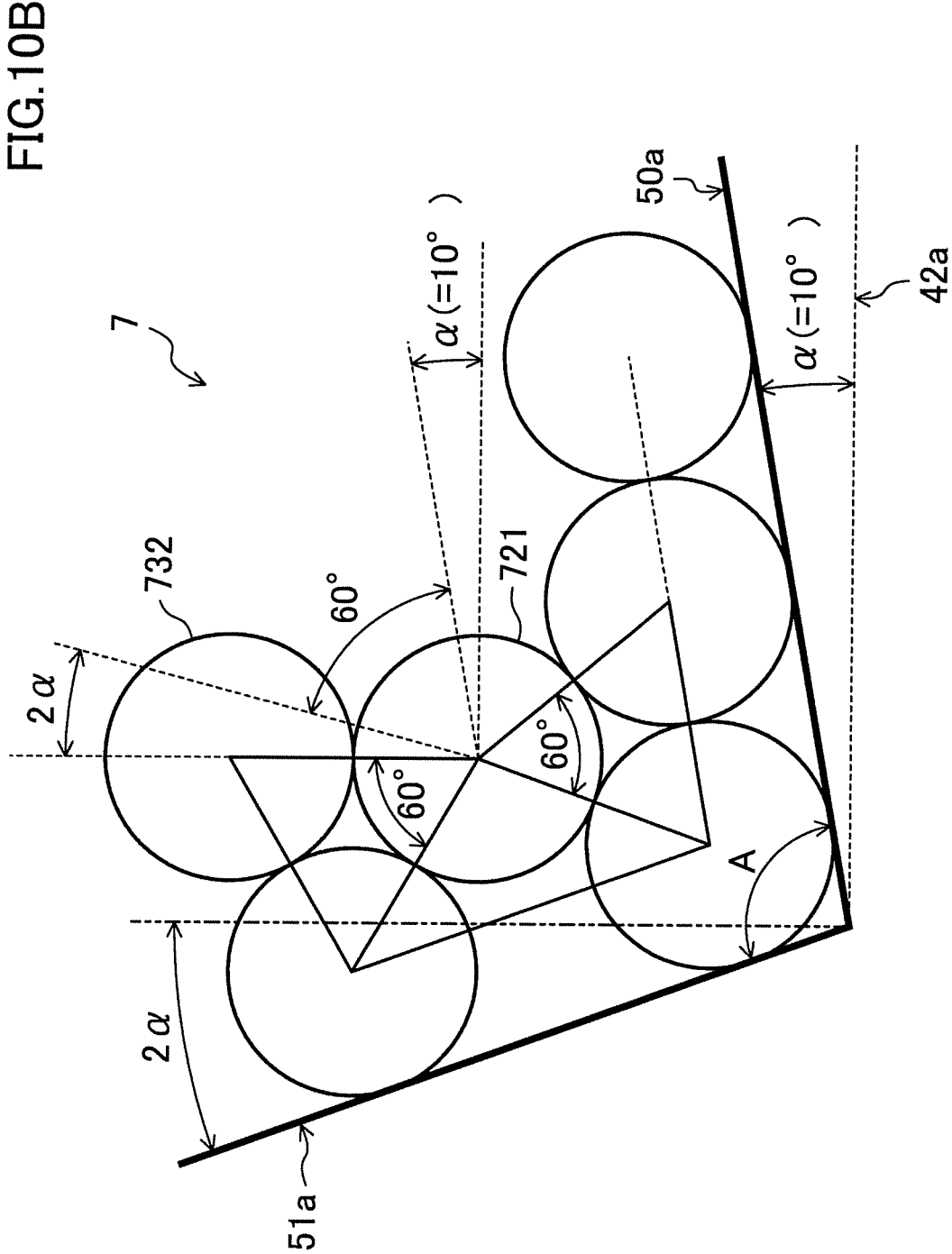

INSULATOR, AND STATOR AND MOTOR COMPRISING SAME

CROSS-REFERENCE OF RELATED APPLICATIONS

This application is the U.S. National Phase under 35 U.S.C. § 371 of International Patent Application No. PCT/JP2018/020204, filed on May 25, 2018, which in turn claims the benefit of Japanese Application No. 2017-180488, filed on Sep. 20, 2017, the entire disclosures of which Applications are incorporated by reference herein.

TECHNICAL FIELD

The present invention relates to an insulator wound with a coil, a stator including the insulator, and a motor.

BACKGROUND ART

In recent years, there is an increasing demand for motors for industrial and in-vehicle applications. In particular, there is a demand for an improvement in the efficiency and a reduction in the costs of the motor.

An increase in the space factor of a coil disposed in the slot of a stator is known as one method of improving the efficiency of a motor. An increase in a coil space factor reduces a loss caused by a current flowing through the coil when the motor is driven.

Coils regularly wound around teeth of a stator are generally known as a structure improving a coil space factor. Various configurations are suggested to achieve such coils (see, e.g., Patent Documents 1 to 4). For example, Patent Document 1 suggests achieving a regularly wound coil by forming a step or a slope inside a flange at one or each end of the cylinder of an insulating coil bobbin wound with a coil. Patent Document 2 discloses achieving a regularly wound coil by forming a groove for holding a wound coil in a side surface of an insulator that is attached to a tooth to insulate the coil from the tooth.

CITATION LIST

Patent Document

PATENT DOCUMENT 1: Japanese Unexamined Patent Publication No. H11-122855
PATENT DOCUMENT 2: Japanese Unexamined Patent Publication No. 2006-115565
PATENT DOCUMENT 3: U.S. Pat. No. 6,356,001
Patent Document 4: PCT International Publication No. WO 2011/118357

SUMMARY OF THE INVENTION

Technical Problem

The insulators and coil bobbins in the documents cited above are generally formed by molding resin materials using molds. On the other hand, the performance of a motor may vary depending on user specifications. Thus, even if the same stator core and teeth are used, the diameter of a coil and the number of turns are varied to adjust, for example, the value of the current flowing through the coil so that the performance of the motor meets the individual specifications.

However, the conventional configurations disclosed in Patent Documents 1 and 2 require a change in the width of the holding groove in accordance with the diameter of the coil or change the width of the step or the angle of the slope. It is thus necessary to reform the mold to form an insulator each time, thereby increasing the costs.

The present invention was made in view of the above problems. It is an objective of the present invention to provide an insulator regularly woundable with a coil, even if the diameter of the coil is changed.

Solution to the Problem

In order to achieve the objective, an insulator according to the present invention has a slope provided to a part to be wound with a coil and continuous with a flange in contact with a winding starting part of the coil and inclined at a predetermined angle.

Specifically, the insulator according to the present invention includes: a part to be wound with a coil, the part covering an axial end surface of a tooth protruding from a core segment and a part of at least both circumferential side surfaces of the tooth; a first flange continuous with the part to be wound with the coil at one of sides closer to a proximal end or a distal end of the tooth; and a second flange continuous with the part to be wound with the coil at the other of the sides closer to the proximal end or the distal end of the tooth. The part to be wound with the coil has a slope inclined so that a height from the axial end surface of the tooth increases from the first flange toward the second flange. Expression $0 < (-6.8\,D+b) \leq \alpha < 30$ is satisfied, where b is a constant, $8.3 \leq b \leq 11.6$ is satisfied, D (mm) is a diameter of the coil, and $\alpha$ (°) is an angle of the slope inclined from the axial end surface of the tooth as a reference surface.

With this configuration, the outer circumferential surface of the part to be wound with the coil of the insulator is inclined, and the inclination angle $\alpha$ is defined. This configuration achieves regularly wound coils while reducing winding failure, even if coils with different diameters are wound around the insulator.

Even if the diameter of the coil is changed, there is no need to change the shape of the insulator. This reduces an increase in the manufacturing costs of the insulator.

In one preferred embodiment, the first flange has an inner surface continuous with the slope and opposed to the second flange, and the inner surface is inclined opposite to the second flange, and $0 < \beta < 2\alpha$ and $0 < (-6.8\,D+b) \leq \alpha < 10$ are satisfied, where $\beta$ (°) is an angle of the inner surface inclined from a plane perpendicular to the axial end surface of the tooth as the reference surface.

This configuration increases the space for disposing the coil in the insulator, and stably maintains the multilayer regular winding of the coil in three or more layers.

A stator according to the present invention includes: insulators, each being the insulator, on both axial end surfaces of teeth, each of which is the tooth of the core segment; and a plurality of stator segments, each formed by winding the coil of a winding wire with a circular cross section around the part to be wound with the coil of the insulator. The stator segments are connected to each other in a ring, and the teeth protrude radially inward in the ring.

This configuration increases the coil space factor in the stator.

In one preferred embodiment, the coil is regularly wound in n layers, where n is an integer of three or more, around the part to be wound with the coil.

In one preferred embodiment, a space between the teeth circumferentially adjacent to each other serves as a slot that houses the coil, and in the slot, insulating paper that insulates associated one of the core segments and associated one of the teeth from the coil covers a side surface of the associated one of the teeth and partially overlaps the first and second flanges of the insulator in the axial direction.

This configuration allows for reliable electrical insulation between the teeth adjacent to each other along the circumference of the stator.

The motor according to the present invention at least includes: the stator; and a rotor including a rotary shaft located more radially inward in relation to the stator at a predetermined distance.

This configuration increases the coil space factor in the stator, and improves the efficiency of the motor.

Advantages of the Invention

As described above, the present invention achieves regularly wound coils even with different diameters, while reducing winding failure.

BRIEF DESCRIPTION OF THE DRAWINGS

FIG. 4A is a perspective view of the part surrounded by a broken line shown in FIG. 1.

FIG. 4B is a side view of the structure shown in FIG. 4A as viewed in a radial direction.

FIG. 4D is a side view of the structure shown in FIG. 4A as viewed in a circumferential direction.

FIG. 10B is a schematic diagram showing the arrangement of the coil wound around the insulator, and illustrating the limit of maintaining the regular winding of the coil.

DESCRIPTION OF EMBODIMENT

An embodiment of the present invention will be described in detail with reference to the drawings. The following embodiment is merely exemplary one in nature, and is not intended to limit the scope, applications, or use of the invention.

Embodiment

[Configurations of Main Elements of Motor and Stator]

Figure 1:
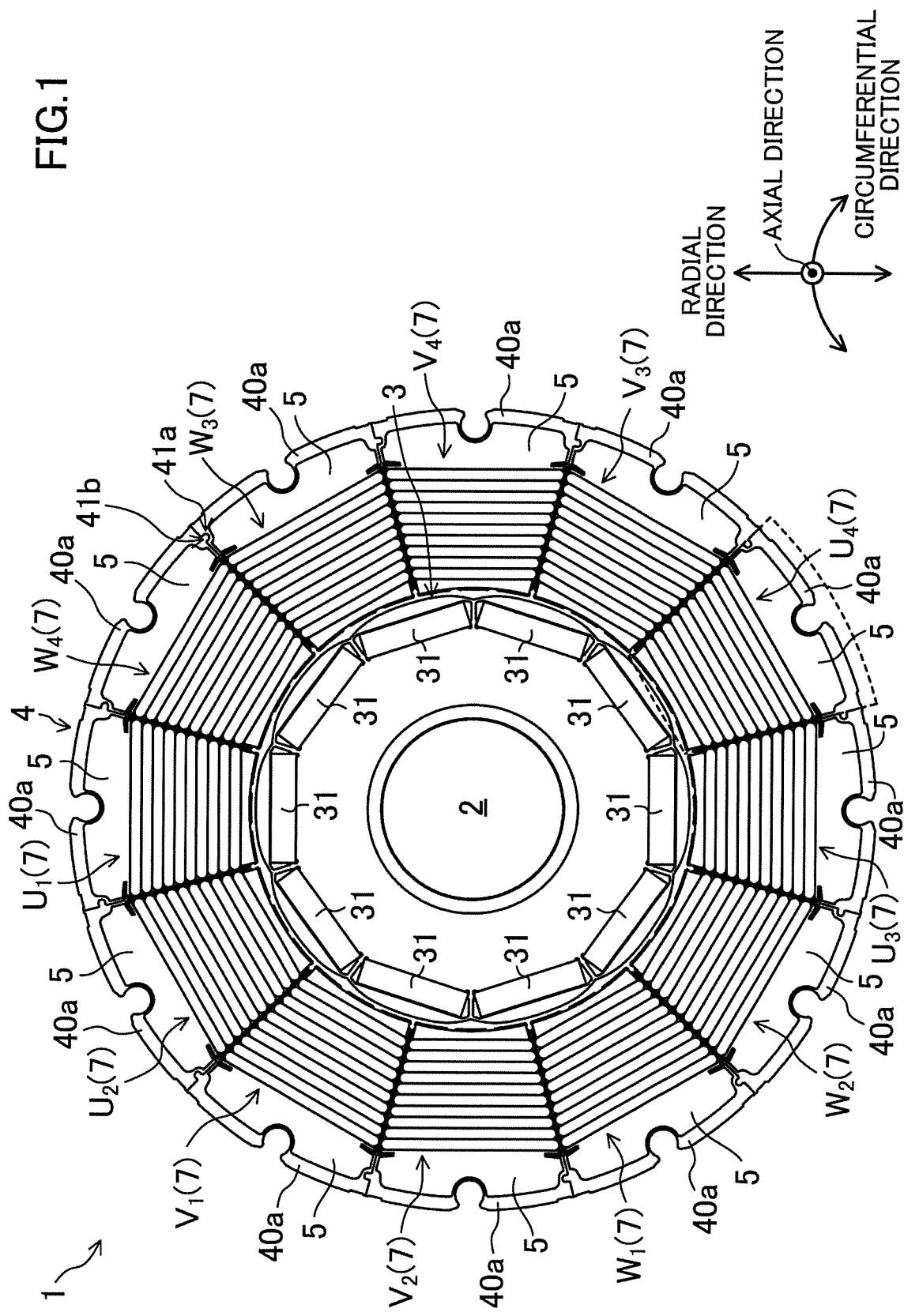
FIG. 1 is a top view of a motor according to a first embodiment.
Figure 2:
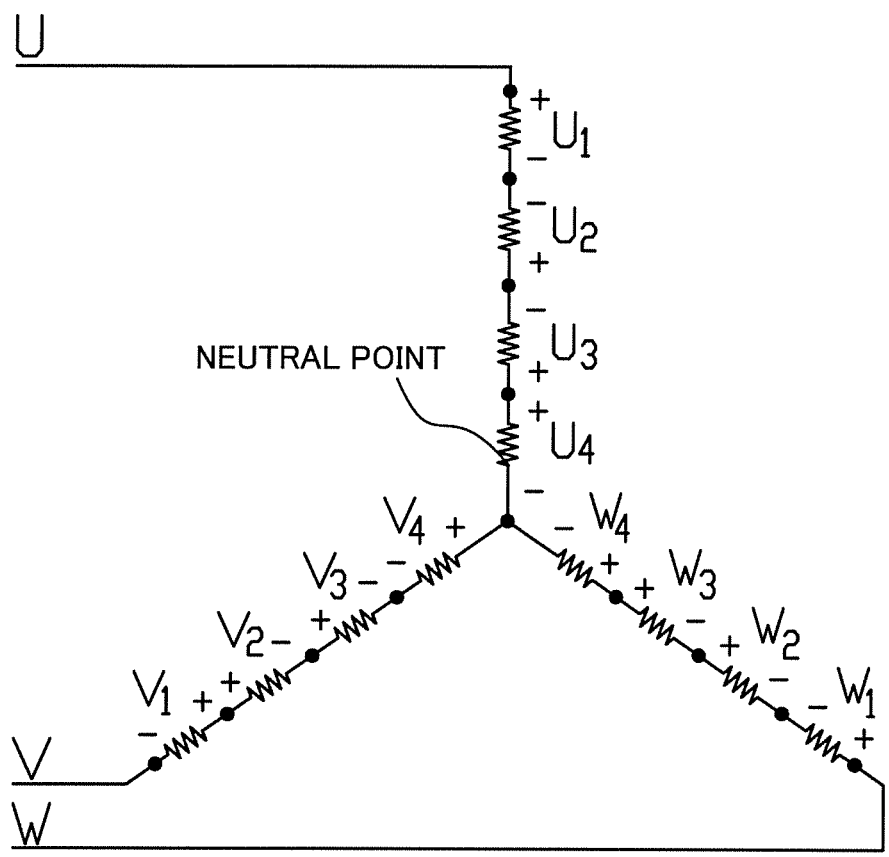
FIG. 2 is an equivalent circuit diagram of the motor shown in FIG. 1.
Figure 3:
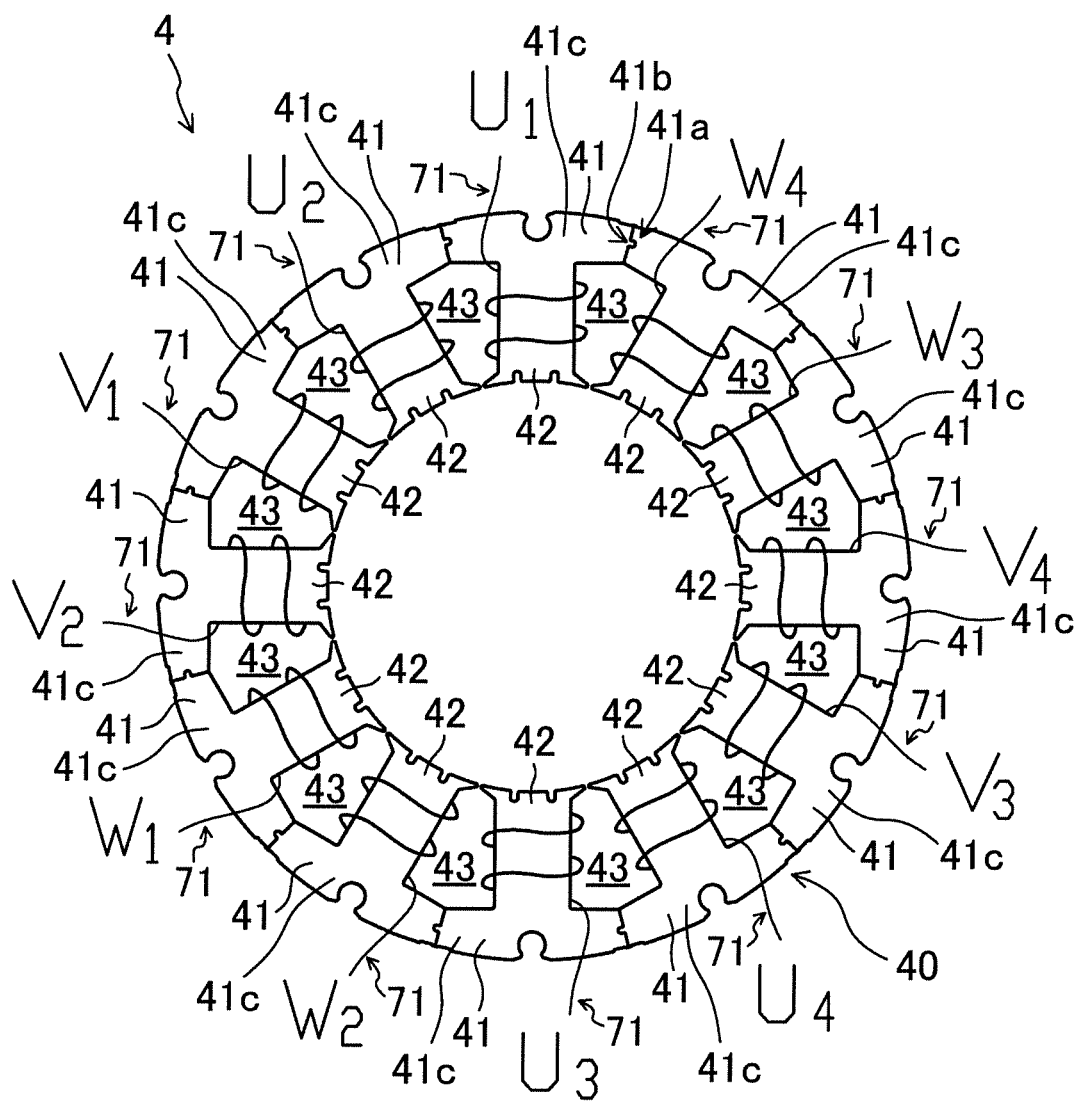
FIG. 3 is a general schematic view of a stator.

FIG. 1 is a top view of a motor according to this embodiment. FIG. 2 is an equivalent circuit diagram of the motor shown in FIG. 1. FIG. 3 is a general schematic view of a stator 4 as viewed along the axis of a shaft 2. For convenience of description, some components and their functions are not shown in FIGS. 1 and 3 and description thereof will be omitted. For example, frames and bus bars are not shown. An exterior body housing the stator 4 is also not shown. The exterior body is, for example, a cylinder, a substantial cuboid, a substantially rectangular cuboid, or a polygonal prism made of metal. The shape is selected as appropriate in accordance with the specifications of a motor 1. FIG. 3 does not show an insulator 5. The components are simply shown. For example, the shapes of the insulators 5 shown in FIG. 1 are partially different from the actual shapes. The shapes of the coils U1 to W4 and their lead terminals 71 shown in FIG. 3 are largely different from the actual shapes. In FIG. 2, symbols + indicate the start of winding of coils, whereas − symbols indicate the end of winding of the coils.

In the following description, the longitudinal direction of the shaft 2 may be referred to as an axial direction, the radial direction of the stator 4 as a radial direction, and the circumferential direction of the stator 4 as a circumferential direction. In the axial direction, each of the coils U1 to W4 has a lead terminal 71 on its top, which may be referred to as an upper side, whereas the opposite as a lower side. In the radial direction, the stator 4 has the shaft 2 and a rotor at its center, which may be referred to as an inner side, whereas the opposite where a stator core 40 is located as an outer side.

The direction in which electromagnetic steel sheets are stacked is the same as the axial direction, which are used as synonymous.

In the following description, the terms "tooth" and "teeth" (the plural of tooth) will be used separately. A plurality of teeth protruding toward the center of a ring stator core are referred to as teeth 42 (the plural of tooth). Each of the teeth of the stator core 40 is referred to as a tooth 42. Similarly, a plurality of teeth of core segments 41 are referred to as teeth 42, which will be described later. Each of the teeth of the core segments 41 is referred to as a tooth 42. Patent Documents 3 and 4 described above are known documents using the terms "tooth" and "teeth" (the plural of tooth 42) separately.

The motor 1 includes a rotor 3, the stator 4, and the coils U1 to W4 inside the exterior body (not shown). The rotor 3 includes the shaft 2 as the rotation axis of the motor 1.

The rotor 3 is in contact with the outer circumference of the shaft 2, and includes magnets 31 facing the stator 4, with N and S poles arranged alternately along the outer circumference of the shaft 2. While the magnets 31 used for the rotor 3 are neodymium magnets in this embodiment, the material, shape, and characteristics of the magnets may be changed as appropriate in accordance with the output of the motor, for example. As viewed in the axial direction, the rotor 3 is disposed more radially inward than the stator 4 at a certain distance.

The stator 4 is in the shape of a cylinder formed by connecting a plurality of stator segments 40a in a ring. Each of the stator segments 40a is formed as follows. The insulators 5 are attached to both the upper and lower end surfaces of the tooth 42 of each core segment 41 in the axial direction. Insulators such as insulating paper 6 are attached between the insulators 5. A winding wire is wound around the part 50 of each insulator 5 wound with a coil and the part of the insulating paper 6 provided with the insulator to form the coil U1, for example. The appearance shape of the stator segment 40a formed as described above is a column with a substantially sector cross section. The stator 4 and the stator segments 40a include the plurality of core segments 41 and teeth 42 protruding radially inward from the inner peripheries of the respective core segments 41. Each core segment 41 is in the shape of a column that constitutes a part of the substantially cylindrical stator core 40. Each core segment 41 is a multilayer of plate bodies (i.e., core segment sheets) punched out of an electromagnetic steel sheet containing, for example, silicon. The plate bodies (i.e., core segment sheets) are pieces constituting a part of the substantially ring stator core plate body (i.e., a stator core sheet). The appearance of each core segment 41 configured as described above is a column with a cross section in the shape of a piece constituting the part of the substantially annular stator core plate body (i.e., the stator core sheet). The plate bodies are stacked in the normal direction of the surfaces of the plate bodies. Each core segment 41 includes a yoke 41c and one of the teeth 42 protruding from a substantial center of the yoke 41c.

Each core segment 41 has a recess 41a in one circumferential side surface of the yoke 41c, and a projection 41b in the other. Both the recess 41a and the projection 41b extend axially over the side surfaces.

Focusing on one core segment 41 (here referred to as "this core segment 41") in the configuration of the ring stator core 40, the projection 41b of the core segment 41 circumferentially adjacent to this core segment 41 on one side is fitted into the recess 41a of this core segment 41. The projection 41b of this core segment 41 is fitted into the recess 41a of the core segment 41 circumferentially adjacent to this core segment 41 on the other side. Accordingly, the core segments are connected. In this manner, circumferentially adjacent core segments 41 are fitted into and connected to each other to form the ring stator core 40.

As shown in FIG. 3, the core segments 41 are connected to each other to form the ring stator core 40, thereby arranging the teeth 42 at equal intervals along the inner circumference of the stator core 40. The gaps between the circumferentially adjacent teeth 42 serve as slots 43.

The stator 4 includes twelve coils U1 to W4, which are attached to the teeth 42 through the insulators 5 and the insulating paper 6 (see FIGS. 4A to 4D) and are disposed in the slots 43 as viewed in the axial direction. Although not shown, the coils U1 to W4 are winding wires made of a metal material, such as copper, with a surface coated with an insulator film, and having a circular cross section. The coils U1 to W4 are wound around insulators 5 by multilayer regular winding. The term "circular" meant here includes a machining tolerance of the wire and deformation of the wire when being wound around each tooth 42. This applies to the following description. In the following description, unspecified one of the coils U1 to W4 representing their structure and other features is referred to as a coil 7.

As shown in FIG. 2, the coils U1 to U4, V1 to V4, and W1 to W4 are connected in series. The coils U1 to U4, V1 to V4, and W1 to W4 are supplied with currents of the three U, V and W phases, respectively, with a phase difference corresponding to an electrical angle of 120° and excited to generate a rotating magnetic field. This rotating magnetic field generates torque in the rotor 3, and the shaft 2 is supported by a bearing (not shown) and rotate.

In this embodiment, the number of magnetic poles of the rotor 3 is ten: five N poles opposed to the stator 4 and five S poles, whereas the number of slots 43 is twelve. The numbers are not limited thereto and other number combinations of the magnetic poles and slots are also applicable.

Configurations of Core Segment and Main Part of Insulator

Figure 4C:
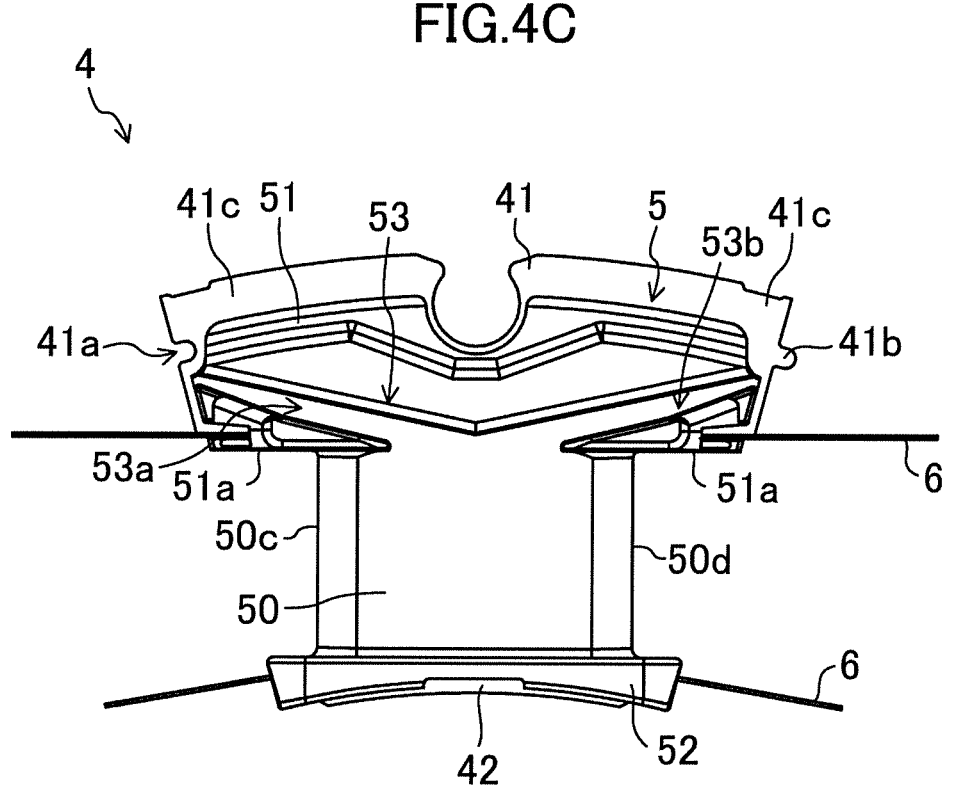
FIG. 4C is a top view of the structure shown in FIG. 4A as viewed in an axial direction.

FIGS. 4A to 4D show the part surrounded by a broken line in FIG. 1. FIG. 4A is a perspective view, FIG. 4B is a side view in the radial direction, FIG. 4C is a top view in the axial direction, and FIG. 4D is a side view in the circumferential direction. For convenience of description, none of FIGS. 4A to 4D shows the coil 7. The figures also show the insulating paper 6 sandwiched and attached among the insulators 5, the core segment 41, and the tooth 42. However, the insulating paper 6 shown here is before being folded to be housed in the slot 43.

As shown in FIGS. 4A to 4D, the insulators 5 in the same shape are attached to both the axially upper and lower end surfaces of the tooth 42 protruding from one core segment 41. The insulating paper 6 is sandwiched among the core segment 41, the tooth 42, and the insulators 5. In this manner, the insulators 5 cover both the axial end surfaces of the tooth 42 and the vicinities of both the end surfaces. In the following description, the axially upper end surface of the tooth 42 may be referred to as an upper surface 42a (see FIG. 5), and the axially lower end surface may be referred to as a lower surface.

Each of the insulators 5 is an insulating member formed by molding an insulating resin material, and includes the part 50 to be wound with the coil 7 (see FIG. 5), a first flange 51, and a second flange 52. The first flange 51 is formed at one end of the part 50. The second flange 52 is formed at the other end of the part 50. In this embodiment, the first flange 51 is attached closer to the core segment 41, whereas the second flange 52 is attached at the distal end of the tooth 42 located radially inward in relation to in the stator 4. The first flange 51 has a coil guide groove 53. To be wound around the part 50, the winding wire of the coil 7 passes through the coil guide groove 53. The winding starting part comes into contact with a radially inner surface of the first flange 51 (hereinafter referred to as the "inner surface 51a of the first flange 51") to be guided to the part 50. In this specification, the winding starting part of the coil 7 corresponds to the vicinity of the first turn of the first layer of the coil 7 wound around the part 50.

Out of the outer circumferential surface of the part 50 wound with the coil, outer circumferential surfaces 50a and 50b covering both end surfaces of the tooth 42 in the axial direction are slopes inclined in respectively predetermined directions. Out of the outer circumferential surface of the part 50 to be wound with the coil, outer circumferential surfaces 50c and 50d covering both the circumferential end surfaces of the tooth 42 are orthogonal to the upper surface 42a of the tooth 42. The term "orthogonal" meant here includes the machining tolerances of the insulators 5 and the tooth 42, and the election tolerances when attaching the insulators 5 to the tooth 42. This applies to the following description.

The inner surface 51a of the first flange 51 is a slope inclined in a predetermined direction from a plane orthogonal to the upper surface 42a or the lower surface of the tooth 42 as a reference plane. The inner surface 51a of the first flange 51 is continuous with the part 50 and opposed to the second flange 52.

The coil guide groove 53 includes a first guide groove 53a and a second guide groove 53b symmetrical with respect to a radial plane. Each of the first and second guide grooves 53a and 53b extends at an acute angle θ from an inner surface 51a of the first flange 51. This configuration also allows guide of a coil 7 wound in a different direction. The first and second guide grooves 53a and 53b may include inside, a coil lock (not shown) that locks the coil 7.

The insulators 5 function to electrically insulate the core 41 and the tooth 42 from the coil 7, together with the insulating paper 6. The insulators 5 also function to stably maintain the regular winding of the coil 7, which will be described later.

The insulating paper 6 is a sheet-like insulating member impregnated with an insulating oil, for example, covers both the circumferential side surfaces of the tooth 42, and partially overlaps the first and second flanges 51 and 52 of the insulators 5 in the axial direction. Although not shown in the figure, when the motor 1 is assembled, the insulating paper 6 is folded to cover the insides of the slots 43. This configuration electrically insulates the core segment 41 and the tooth 42 from the coil 7, and from the circumferentially adjacent core segments 41 and teeth 42.

Application of the insulator 5 according to this embodiment to the stator 4 shown in FIG. 1 achieves stable multilayer regular winding of the coils U1 to W4, thereby increasing the coil space factors in the slots 43 of the stator 4. This improves the efficiency of the motor 1.

Inclination of Outer Circumferential Surface of Part to Be Wound with Coil

Figure 5:
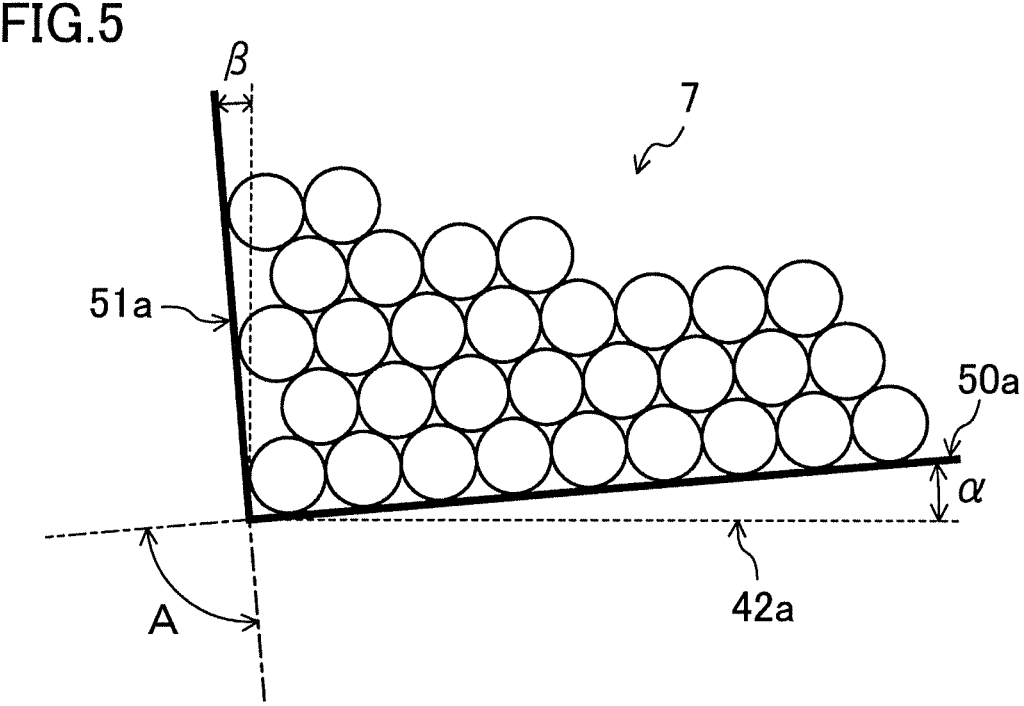
FIG. 5 is a schematic diagram showing the arrangement of a coil wound around an insulator.

FIG. 5 is a schematic diagram showing the arrangement of the coil wound around the insulator according to this embodiment, that is, the arrangement of the insulator 5 and the coil 7 in the circumferential direction.

The outer circumferential surface 50a of the part 50 covering the upper surface 42a of the tooth 42 is the slope inclined at the predetermined angle as described above. As shown in FIG. 4D, the outer circumferential surface 50a is regularly inclined so that a height from the upper surface 42a of the tooth 42 increases from the first flange 51 toward the second flange 52. The outer circumferential surface 50a is inclined at an angle of a)(° from the upper surface 42a of the tooth 42 as a reference surface. The inner circumferential surface (not shown) of the part 50 abuts on the upper surface 42a and a part of both the circumferential side surfaces of the tooth 42. Therefore, the axial thickness of the part 50 increases from the first flange 51 toward the second flange 52. In the insulator 5 covering the lower surface of the tooth 42, the outer circumferential surface 50b of the part 50 is inclined so that the height from the lower surface of the tooth 42 increases from the first flange 51 toward the second flange 52. The outer circumferential surface 50b is inclined at an angle of α (°) from the lower surface of the tooth 42 as a reference surface.

A case where the coil 7 is regularly wound in multiple layers around the insulator 5 with the configuration described above will be considered.

In the process of forming the regularly wound coil 7 in multiple layers, an external force is applied to the lower layer of the coil when the upper layer of the coil is wound, which may cause displacement and winding disorder.

For example, assume that the second layer of the coil is wound once between the last and second to last turns of the first layer of the coil, after the winding of the first layer has ended. Since the second layer is wound with a tensile force, a force is applied from above to the slope to be wound with the coil between the last and second to last turns of the first layer. This causes radially inward displacement of the last turn of the first layer.

On the other hand, the resistance to this displacement increases with an increase in the inclination angle of the outer circumferential surface 50a. This is because the tensile force applied to the winding wire of the coil 7 is applied radially outward in parallel to the outer circumferential surface 50a, and serves as the resistance to the displacement of the coil 7 caused by the external force. This is also attributed to an increase in the tensile force applied in parallel to the outer circumferential surface 50a with an increase in the inclination angle α.

Figure 6:
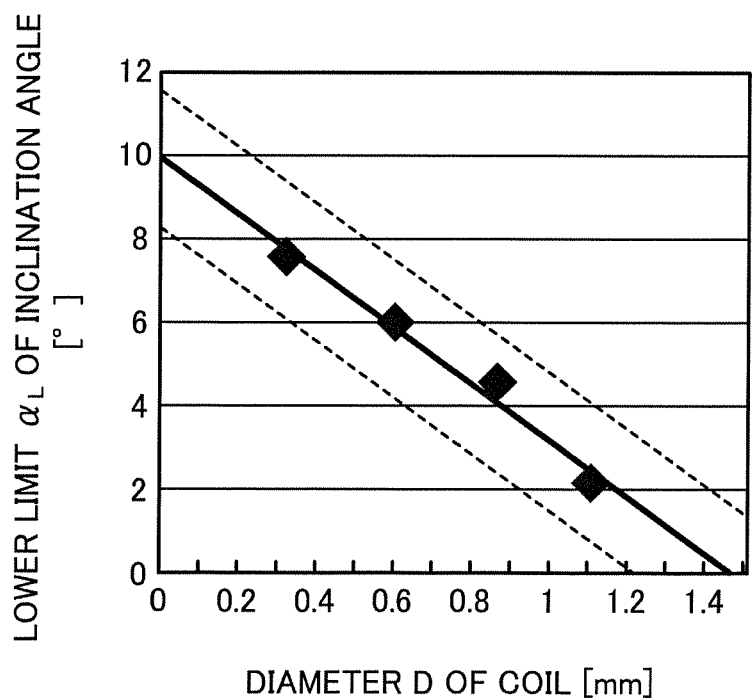
FIG. 6 is a diagram showing the relationship between the lower limit of the inclination angle of the outer circumferential surface of the insulator and the diameter of the coil.
Figure 7:
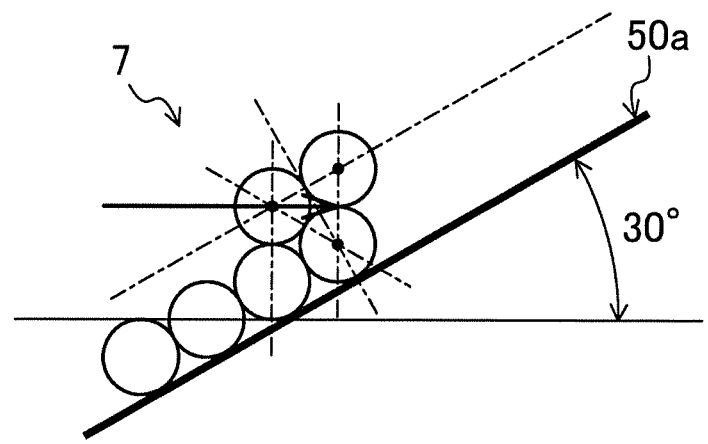
FIG. 7 is a schematic diagram showing the arrangement of the coil wound around the insulator, and illustrating the upper limit of the inclination angle of the outer circumferential surface of the insulator.

FIG. 6 shows the relationship between the lower limit of the inclination angle of the outer circumferential surface of the insulator and the diameter of the coil. FIG. 7 is a schematic diagram showing the arrangement of the coil wound around the insulator, and illustrating the upper limit of the inclination angle of the outer circumferential surface of the insulator.

As shown in FIG. 6, the present inventors have experimentally found the following. The diameter D (mm) of the coil 7 and the lower limit $\alpha_L$ of the inclination angle α, at which the coil 7 regularly wound in multiple layers and made of a winding wire with a circular cross section is stably maintained, satisfy the relation represented by Equation (1).

$$\alpha_L = -6.8D + b \qquad (1)$$

Here, b is a constant within a range from 8.3 to 11.6 (i.e., $8.3 \le b \le 11.6$), which corresponds to the range inside the broken lines shown in FIG. 6. This range is obtained in view of the statistical error 1.63 on the measurement, with respect to the average value 9.8 of b obtained experimentally. Note that the present inventors have experimentally confirmed that the relationship represented by Equation (1) is satisfied well, where the diameter D of the coil 7 falls within a range from 0.32 mm to 1.1 mm.

On the other hand, taken out is an arbitrary section of the winding wire of the coil 7 surrounded by the other sections at the axially upper and lower sides and the radially inner and outer sides. If the arbitrary section is in contact with all the other six sections surrounding the arbitrary section, this is the state where the coil 7 is regularly wound. For example, as shown in FIG. 7, if the second layer of the coil 7 is wound around the insulator 5, the final turn of the first layer of the coil 7 is not caught with the second turn from the start of the second layer in the horizontal direction. This hinders maintenance of the regular winding of the coil 7 (see the arrow in FIG. 7). As viewed geometrically, the upper limit of the inclination angle α is 30°. The "horizontal direction" corresponds to the direction parallel to the upper surface 42a of the tooth 42. This applies to the following description. In addition, the direction perpendicular to the horizontal direction may be referred to as a vertical direction.

From the foregoing, it was found that the inclination angle α needs to satisfy the relationship represented by Expression (2) to maintain stable multilayer regular winding of the coil 7, which is made of a winding wire with a circular cross section, in two or more layers around the insulator 5.

$$0 < (-6.8D + b) \le \alpha < 30 \qquad (2)$$

In this embodiment, the outer circumferential surface 50a of the part 50 of the insulator 5 is the slope inclined at the inclination angle α within the range described above. This configuration achieves the regularly wound coils 7 even with different diameters, while reducing winding failure. For example, as is apparent from FIG. 6, setting of the inclination angle α to 4° stably maintains the multilayer regular winding of the coils even with diameters varying within a range from 0.63 mm to 1.1 mm.

Even if the diameter of the coil 7 is changed, there is no need to change the width of the groove for holding the coil 5 in the insulator unlike Patent Document 2. There is also no need to change the width of the step or the angle of the slope in the insulator unlike Patent Document 1. The configuration according to this embodiment reduces an increase in the manufacturing costs of the insulators 5. Even if coils 7 with different diameters are used together with the core segments 41 and the teeth 42 with the same specifications, the one type of insulators 5 suffices, thereby reducing the costs in developing various types of motors.

[Inclination of Inner Surface of First Flange]

As described above, the outer circumferential surface 50a of the part 50, that is, the surface on which the coil 7 starts being wound, is inclined from the upper surface 42a of the tooth 42 at the angle α within the range expressed by Equation (2), which allows multilayer regular winding of the coil 7 around the insulator 5. On the other hand, as is apparent from FIG. 5, the outer circumferential surface 50a of the part 50 is inclined from the upper surface 42a of the tooth 42, which reduces the region between the outer circumferential surface 50a and the inner surface 51a of the first flange 51. This may reduce the space for winding the coil 7 and hinder the maintenance of the multilayer regular winding of the coil 7 in three or more layers.

The present inventors paid attention to the inclination of the inner surface 51a of the first flange 51 in order to stably maintain the multilayer regular winding of the coil 7.

Figure 8:
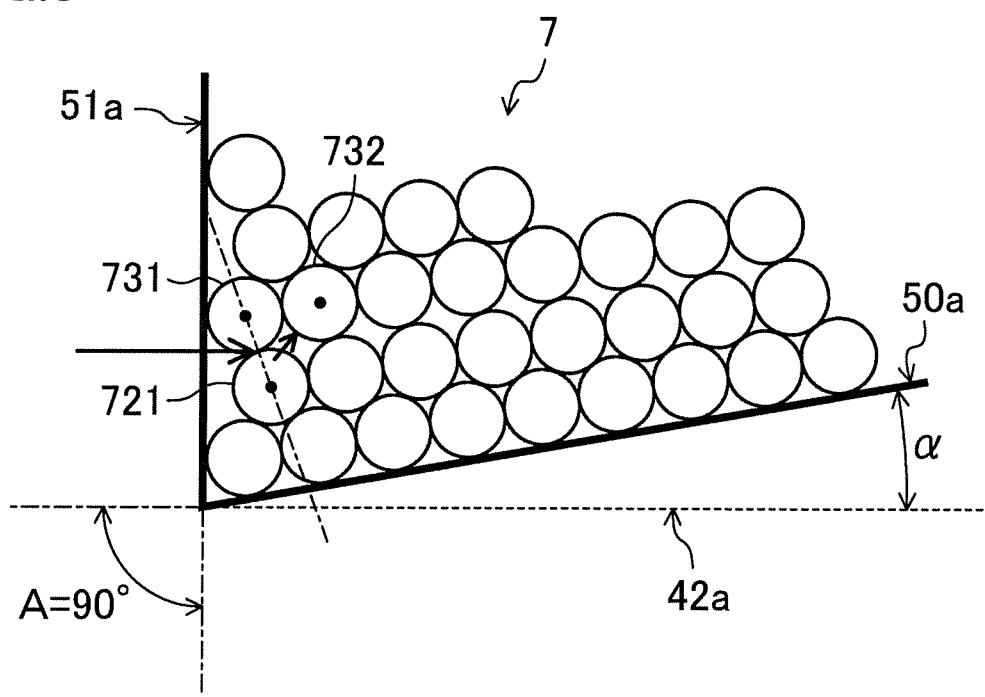
FIG. 8 is a schematic diagram showing the arrangement of the coil wound around the insulator, and illustrating the lower limit of the inclination angle of the inner surface of a first flange.
Figure 9:
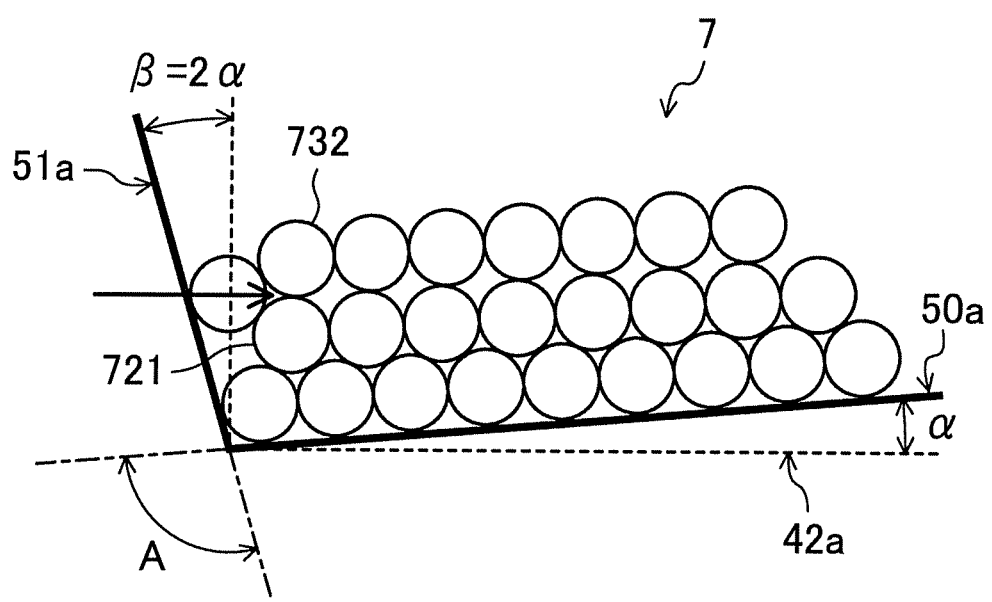
FIG. 9 is a schematic diagram showing the arrangement of the coil wound around the insulator, and illustrating the upper limit of the inclination angle of the inner surface of the first flange.

FIGS. 8 and 9 are schematic diagrams showing the arrangement of the coil wound around the insulator. FIG. 8 illustrates the lower limit of the inclination angle of the inner surface of the first flange. FIG. 9 illustrates the upper limit of the inclination angle of the inner surface of the first flange.

In this embodiment, the inner surface 51a of the first flange 51 continuous with the outer circumferential surface 50a of the part 50 is, as described above, the slope inclined at the predetermined angle. As shown in FIG. 5, the slope is inclined radially outward from the plane orthogonal to the upper surface 42a of the tooth 42 as the reference plane, and the inclination angle is β (°). Although not shown, the inner surface 51a of the first flange 51 continuous with the outer circumferential surface 50b of the part 50 is inclined outward in the radial direction from the plane orthogonal to the lower surface of the tooth 42 as a reference plane, and the inclination angle is β (°).

In this manner, the radially outward inclination of the inner surface 51a of the first flange 51 stably maintains the multilayer regular winding of the coil 7.

As shown in FIG. 8, the angle β of 0° hinders the contact between a winding wire section 732 corresponding to the second turn of the third layer of the coil and a winding wire section 721 corresponding to the first turn of the second layer. This leads to unstable winding and hinders regular winding. A greater angle α hinders the catch in the horizontal direction between a winding wire section 731 corresponding to the first turn of the third layer and the winding wire section 721 corresponding to the first turn of the second layer (see the arrows in FIG. 8). Thus, the angle β needs to be greater than 0°. On the other hand, as shown in FIG. 9, the angle β equal to 2α (i.e., β=2α) hinders the catch in the horizontal direction between the winding wire section 732 corresponding to the second turn of the third layer and the winding wire section 721 corresponding to the first turn of the second layer (see the arrows in FIG. 9). Thus, the angle β needs to be smaller than 2α. That is, the inclination angle β within the range shown in Expression (3) allows multilayer regular winding of the coil around the part 50.

$$0<\beta<2\alpha \quad (3)$$

In this case, the angle A between the part 50 to be wound with the coil and the inner surface 51a of the first flange 51 is expressed by the following Expression (4).

$$(90-\alpha)<A<(90+\alpha) \quad (4)$$

An upper limit of the inclination angle β smaller than 2α further limits the range of the inclination angle α of the outer circumferential surface 50a of the part 50.

Figure 10A:
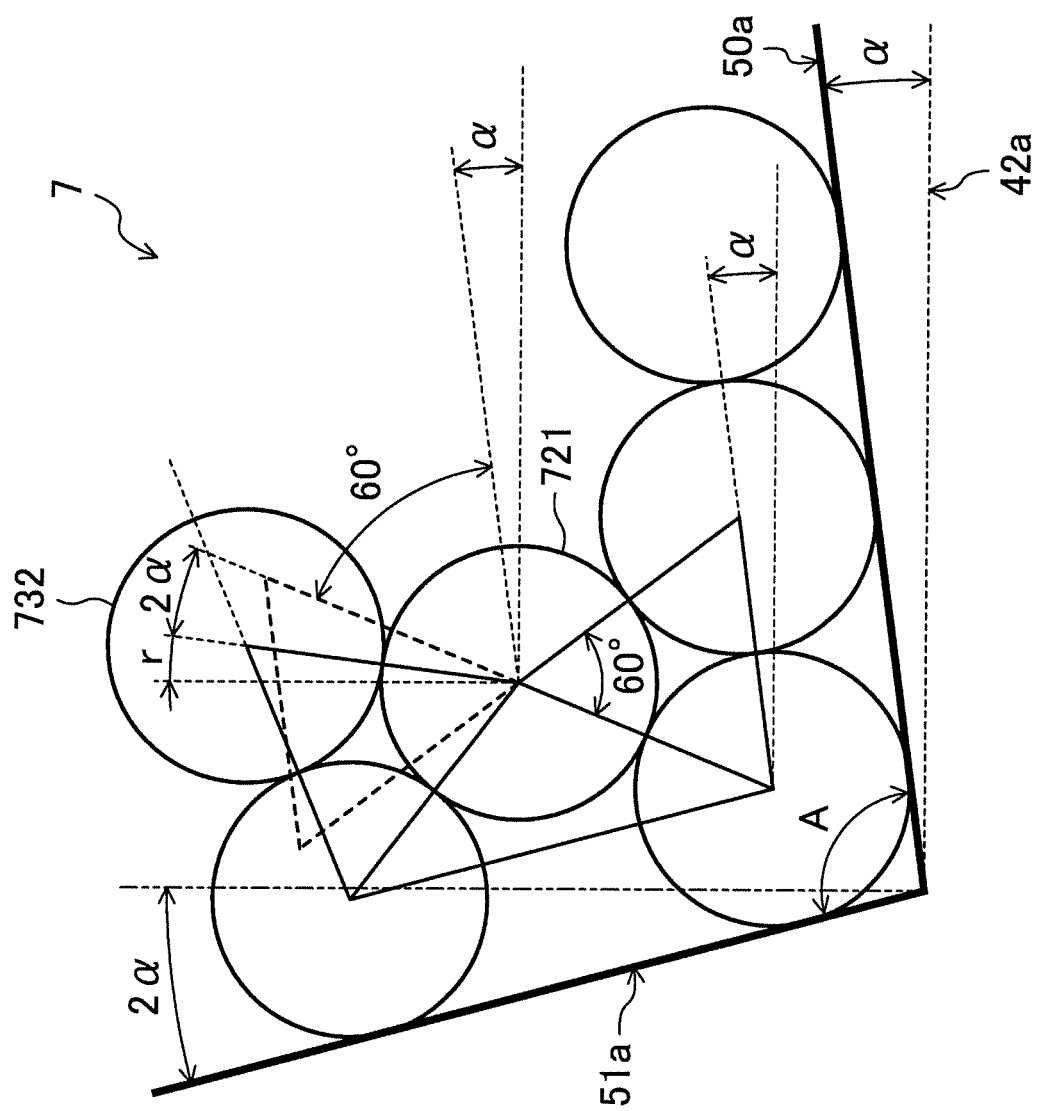
FIG. 10A is a schematic diagram showing the arrangement of the coil wound around the insulator, and illustrating that regular winding of the coil is maintained.

FIGS. 10A and 10B are schematic diagrams showing the arrangement of the coil wound around the insulator. FIG. 10A illustrates that regular winding of the coil is maintained. FIG. 10B illustrates the limit of maintaining the regular winding of the coil. FIGS. 10A and 10B show the case where the inclination angle β is equal to 2α (i.e., β=2α).

As shown in FIG. 10A, in the state where regular winding of the coil is maintained, the winding wire section 732 corresponding to the second turn of the third layer of the coil is in contact with the winding wire section 721 corresponding to the first turn of the second layer. If the angle γ between the line segment connecting the centers of the winding wire sections 732 and 721 and the vertical direction is larger than 0° (i.e., γ>0°), the regular winding of the coil 7 is stably maintained. On the other hand, as shown in FIG. 10B, if the line segment connecting the centers of the winding wire sections 732 and 721 extends in the vertical direction, that is, γ is equal to 0° (i.e., γ=0°), there is no horizontal catch between the winding wire sections 732 and 721. The regular winding of the coil 7 cannot be maintained. At this time, as is apparent from FIG. 10B, $$\alpha+60°+2\alpha=3\alpha+60°=90° \quad (5)$$

The upper limit of the inclination angle α is thus 10°, and Expression (2) is transformed into the following Expression (6).

$$0<(-6.8D+b)\leq\alpha<10 \quad (6)$$

At this time, the angle A falls within a range indicated by Expression (7).

$$80<A<100 \quad (7)$$

As described above, the inclination angles α and β within the ranges shown in Expressions (4) and (6) provide the following advantages in addition to the advantages described above. The angles increase the space for arranging the coil 7 and for winding the coil 7 to stably maintain the multilayer regular winding of the coil 7 in three or more layers.

In the embodiment described above, an example has been described where the coil 7 starts to be wound from the first flange 51 located at the core segment 41. The configuration is not particularly limited thereto. The coil 7 may start to be wound from the second flange 52 located at the distal end of the tooth 42. In this case, the outer circumferential surface 50a is inclined in the opposite direction. In short, the outer circumferential surface 50a may be a slope inclined at a predetermined inclination angle α so that the height from the upper surface 42a of the tooth 42 increases from the flange in contact with the winding starting part of the coil 7 toward the flange located opposite to the flange in the radial direction. In the same sense, the inner surface of the flange in contact with the winding starting part of the coil 7 is not limited to the radially inner surface. The inner surface of the flange may be a slope inclined at the angle β on the opposite side to the part 50 to be wound with the coil as viewed in the axial direction. The inner surface 51a of the first flange 51 may be orthogonal to the upper surface 42a or the lower surface of the tooth.

How to wind the coil 7 is not particularly limited, and general nozzle winding or flyer winding may be employed, for example.

An example has been described where the insulators 5 are of what is called a split type and attached to the associated tooth 42 from above and below. The configuration is not particularly limited thereto. Each insulator 5 may have an integral structure including a tubular part 50 to be wound with the coil to cover the entire outer circumference of the tooth 42. Such an insulator 5 with an integral structure may be used, if the stator 4 is formed by attaching the teeth 42 to the respective core segments 41 afterwards, for example. Alternatively, the insulators 5 attached to one tooth from above and below do not have to have the same shape. In the insulator 5 at the winding starting point of the coil 7 that has passed through the coil guide groove 53, the part 50a and the first flange 51 only need to have the shape described in the embodiment described above including the variations. The use of the insulators 5 attached to one tooth from above and below having the same shape reduces the number of types of the insulators 5 to reduce the manufacturing costs, for example.

An example has been described in the embodiment where the outer circumferential surface 50a of the part 50 is the slope regularly inclined from the first flange 51 to the second flange 52. The configuration is not particularly limited thereto. The outer circumferential surface 50a may include a part parallel to the upper surface 42a of the tooth 42 or may include a part inclined at an angle different from the angle α. Out of the outer circumferential surface 50a, the plane extending from the inner surface 51a of the first flange 51 to the plane abutting on the first to n-th turns, where n is an integer up to ten, of the first layer of the coil 7 may be inclined at the angle α. The outer circumferential surfaces 50c and 50d of the part 50 may be inclined from the upper surface 42a of the tooth 42 as viewed in the axial direction. As shown in FIGS. 4A to 4D, if the outer circumferential surfaces 50c and 50d of the part 50 are orthogonal to the upper surface 42a of the tooth 42 as viewed in the axial direction, the insulator 5 can be miniaturized. This also increases the volume of the slot 43 and the number of turns of the coil 7, thereby improving the efficiency of the motor 1.

In the above embodiment, the coil guide groove 53 is composed of two grooves; namely, the first guide groove 53a and the second guide groove 53b. Alternatively, the coil guide groove 53 may be composed of only one of the grooves.

It is clear that the insulators 5 according to the embodiment also stably maintain regular winding, even if the coils 7 are wound in only one or two layers. An example has been described in the embodiment where the insulators 5 according to the present invention are attached to the teeth 42 of the respective core segments 41 and the coils 7 are wound around the respective parts 50 to form the stator segments 40a. The insulators 5 according to the present invention may be attached to the respective teeth 42 of the ring stator core and the coils 7 may be wound around the respective parts 50. The "ring stator core" here is formed by stacking plate bodies punched out of an electromagnetic steel sheet into ring shapes. The ring stator core has the plurality of teeth.

An example has been described in the embodiment where each core segment has one of the teeth. Alternatively, each core segment may have two or more of the teeth.

An example has been described in the embodiment where the motor 1 of the first embodiment is used for an inner rotor motor.

As shown in FIG. 3, each tooth 42 has two recessed grooves at its distal end (i.e., the radially inner end). These recessed grooves are also referred to as "supplemental grooves" in U.S. Pat. No. 6,104,117 and Japanese Unexamined Patent Publication No. H10-42531, for example. The "supplemental grooves" are advantages in reducing cogging torque and torque ripple in the rotation operation of the rotor 4 of the motor 1, and contribute to reduced vibration, reduced noise, and other characteristics of the motor.

The winding wires in this embodiment are also referred to as electric wires for winding. The conductors of the winding wires or electric wires for winding contain copper or aluminum with unavoidable impurities. Unavoidable impurities here mean a tiny amount of impurity elements unavoidably mixed into copper or aluminum during the manufacturing process. For copper, unavoidable impurities may be As, Bi, Sb, Pb, Fe, S, or oxygen, for example. For aluminum, unavoidable impurities may be Si, Mn, Ti, V, Zr, Fe, or Cu, for example. The conductors of the winding wires are covered with an insulating layer made of an insulating resin. As the insulating resin, for example, polyimide, polyamide-imide, polyester-imide, polyesteramideimide, polyamide, polyhydantoin, polyurethane, polyacetal, or an epoxy resin may be selected as appropriate in accordance with the specifications of the motor 1.

The material component of the magnets 31 according to the embodiment contains Fe or Fe and Co, as well as B and at least one kind of Sc, Y and lanthanoid-based elements. Specifically, the magnets 31 are rare earth sintered magnets, what is called neodymium sintered magnets, for example. Each of the rare earth sintered magnets includes, as its surface layer, a rust-proof film (or a rust-proof layer) for reducing rust.

INDUSTRIAL APPLICABILITY

The insulator according to the present invention provides regularly wound coils, while accepting different diameters of the coils, and is thus useful for applications in, for example, motors required to have high efficiency.

DESCRIPTION OF REFERENCE CHARACTERS

1 Motor
2 Shaft
3 Rotor
4 Stator
5 Insulator
6 Insulating Paper
7 Coil
31 Magnet
40 Stator Core
40a Stator Segment
41 Core Segment
41c Yoke
42 Tooth
42a Upper Surface (Axial End Surface) of Tooth 42
43 Slot
50 Part to Be Wound with Coil
50a Outer Circumferential Surface (Slope) of Part 50 to Be Wound with Coil 51 First Flange
51a Inner Surface of First Flange 51
52 Second Flange
53 Coil Guide Groove
71 Lead Terminal
U1 to W4 Coil
α Inclination Angle of Outer Circumferential Surface 50a
β Inclination Angle of Inner Surface 51a of First Flange 51
A Angle between Outer Circumferential Surface 50a and Inner Surface 51a of First Flange 51

The invention claimed is:

1. An insulator comprising:
a part to be wound with a coil, the part covering an axial end surface of a tooth protruding from a core segment and a part of at least both circumferential side surfaces of the tooth;
a first flange continuous with the part to be wound with the coil at one of sides closer to a proximal end or a distal end of the tooth; and
a second flange continuous with the part to be wound with the coil at the other of the sides closer to the proximal end or the distal end of the tooth, wherein
the part to be wound with the coil has a slope inclined so that a height from the axial end surface of the tooth increases from the first flange toward the second flange, $0<(-6.8D+b)\leq\alpha<30$ is satisfied, where b is a constant, $8.3\leq b\leq 11.6$ is satisfied, D (mm) is a diameter of the coil, and α (°) is an angle of the slope inclined from the axial end surface of the tooth as a reference surface, and
the first flange has an inner surface continuous with the slope and opposed to the second flange, and the inner surface is inclined opposite to the second flange, and $0<\beta<2\alpha$ and $0<(-6.8D+b)\leq\alpha<10$ are satisfied, where β (°) is an angle of the inner surface inclined from a plane perpendicular to the axial end surface of the tooth as the reference surface.

2. A stator comprising:
insulators, each being the insulator of claim 1, on both axial end surfaces of teeth, each of which is the tooth of the core segment; and
a plurality of stator segments, each formed by winding the coil of a winding wire with a circular cross section around the part to be wound with the coil of the insulator, wherein
the stator segments are connected to each other in a ring, and the teeth protrude radially inward in the ring.

3. The stator of claim 2, wherein
the coil is regularly wound in n layers, where n is an integer of three or more, around the part to be wound with the coil.

4. The stator of claim 3, wherein
a space between the teeth circumferentially adjacent to each other serves as a slot that houses the coil, and
in the slot, insulating paper that insulates associated one of the core segments and associated one of the teeth from the coil covers a side surface of the associated one of the teeth and partially overlaps the first and second flanges of the insulator in the axial direction.

5. A motor at least comprising:
the stator of claim 4; and
a rotor including a rotary shaft located more radially inward in relation to the stator at a predetermined distance.

6. A motor at least comprising:
the stator of claim 3; and
a rotor including a rotary shaft located more radially inward in relation to the stator at a predetermined distance.

7. The stator of claim 2, wherein
a space between the teeth circumferentially adjacent to each other serves as a slot that houses the coil, and
in the slot, insulating paper that insulates associated one of the core segments and associated one of the teeth from the coil covers a side surface of the associated one of the teeth and partially overlaps the first and second flanges of the insulator in the axial direction.

8. A motor at least comprising:
the stator of claim 7; and
a rotor including a rotary shaft located more radially inward in relation to the stator at a predetermined distance.

9. A motor at least comprising:
the stator of claim 2; and
a rotor including a rotary shaft located more radially inward in relation to the stator at a predetermined distance.

* * * * *